UNITED STATES PATENT OFFICE.

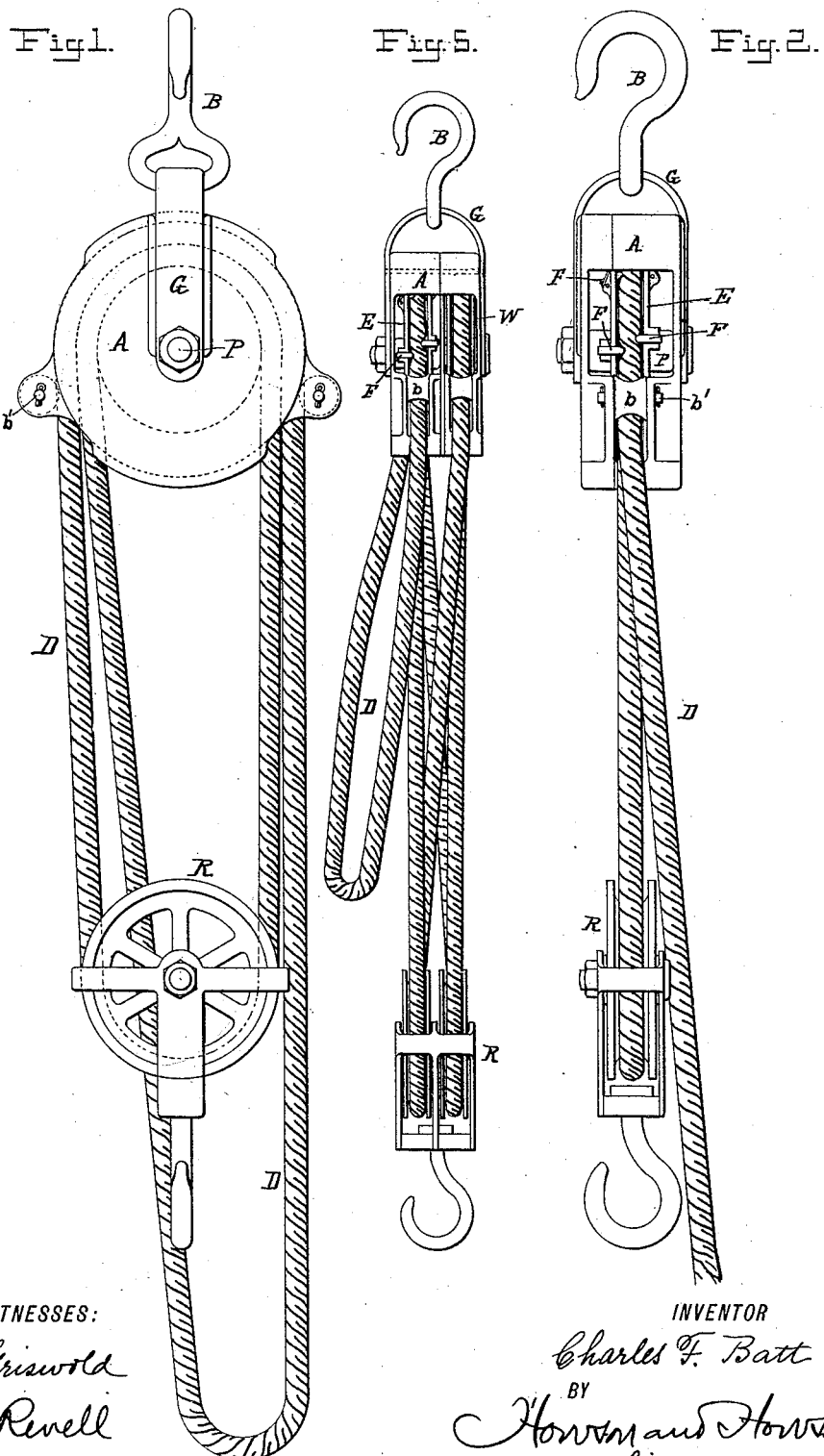

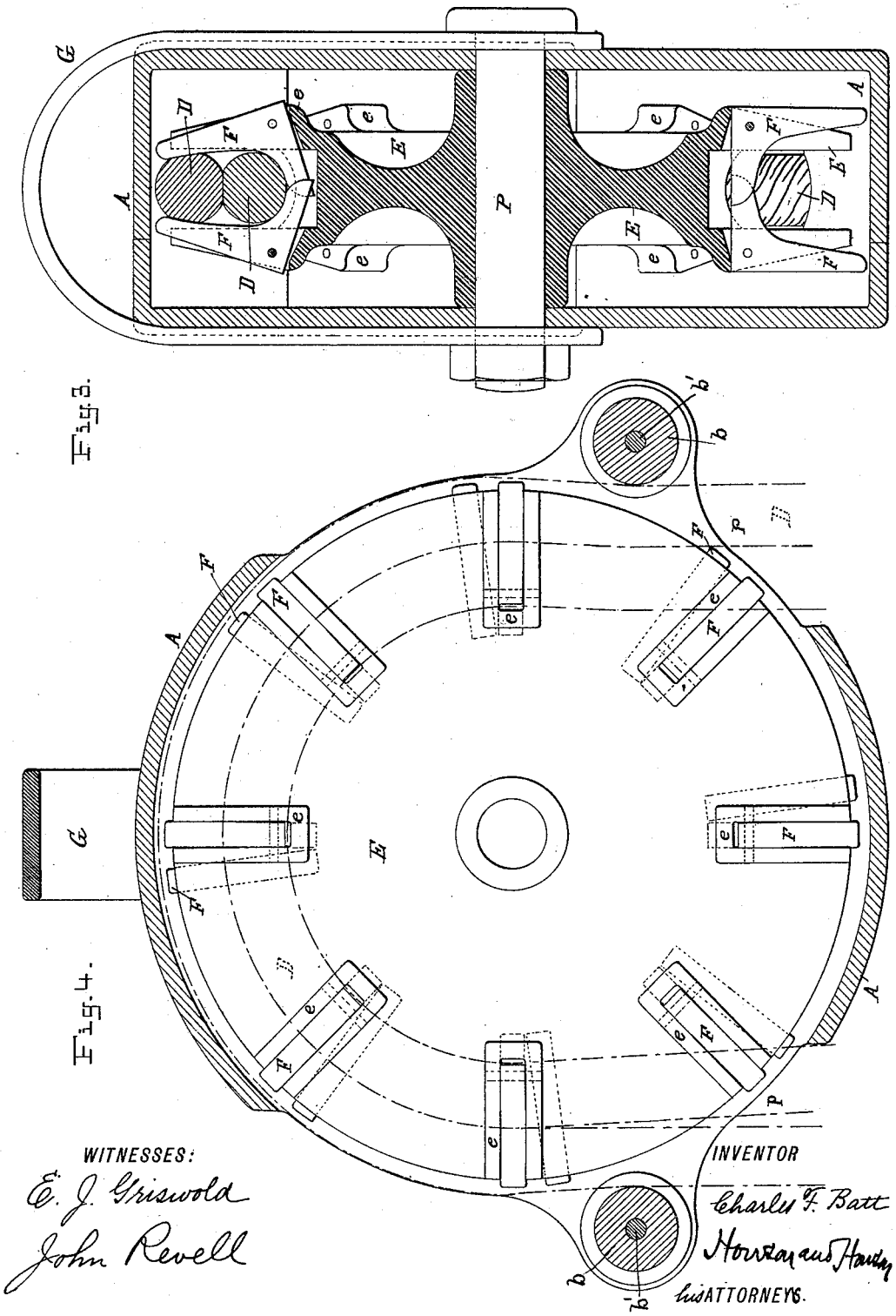

CHARLES F. BATT, OF BROOKLYN, NEW YORK.

SELF-LOCKING DIFFERENTIAL HOIST.

SPECIFICATION forming part of Letters Patent No. 411,086, dated September 17, 1889.

Application filed June 27, 1889. Serial No. 315,801. (No model.)

*To all whom it may concern:*

Be it known that I, CHARLES F. BATT, a citizen of the United States, and a resident of Brooklyn, Kings county, New York, have invented an Improved Self-Locking Differential Hoist, of which the following is a specification.

The object of my invention is to make a self-locking differential hoisting-pulley of the simplest possible construction.

In the accompanying drawings, Figure 1 is a side view of my improved self-locking differential hoisting-pulley provided with a runner. Fig. 2 is a corresponding edge view of the same. Figs. 3 and 4 are vertical sections of the differential pulley-block at right angles to each other, drawn to an enlarged scale; and Fig. 5 is a view of a modification drawn to a smaller scale.

In Figs. 1 and 2, A is the block containing the differential pulley-wheel and having a suitable hook B for the suspension of the tackle by the yoke G, through which the center pin P passes. The rope D carries in one of its bottom loops the runner R, from which the weight is to be suspended, and which may be of any suitable construction.

In differential pulleys of ordinary construction the pulley-wheel is usually provided with two separate grooves of different diameters for the two turns of chain or rope, the hoisting-power of the differential tackle depending on the difference between these diameters. In my differential pulley, however, the two turns of rope are so guided that they lie one on the top of the other where they pass over the pulley-wheel; and an important feature of my invention is the combination, with the pulley-wheel and the two turns of rope lying over each other on the wheel, of devices to automatically grip the rope under the weight of the load. For this purpose I provide the pulley-wheel E, having a single deep guiding-groove for the two turns of rope, with a series of gripping-levers F, pivoted to the wheel and of such a construction that the strain upon the rope of the weight being hoisted will so act upon these levers that they will grip the outer turn of the rope and prevent the wheel from turning except when the hoisting-power is applied. By this means the pulley is self-locking with the load at any height, and the holding-power of the levers is in exact proportion to the load.

The differential pulley may be either mounted to turn on the center pin P or may be fixed to the pin, which will then turn in bearings in the block. In the latter case the hoisting-power may be applied to the differential pulley, instead of directly to the rope.

I prefer to construct the gripping-levers F of the elbow-lever form illustrated in Fig. 3, and to pivot them within lateral notches in the side flanges of the groove of the wheel. Ears $e$ are formed at the edges of the notches for convenience in pivoting these levers and for purposes of strength. I prefer to mount these gripping-levers in both flanges of the grooved pulley on opposite sides of the rope, although this may not be necessary in hoisting-pulleys for light loads.

I prefer when using gripping-levers on both sides of the rope to arrange them in pairs, as illustrated in Fig. 4, but a little out of line with each other, so that the lower arms of the two elbow-levers may overlap each other, as shown in Fig. 3, and so that the upright arms of these two elbow-levers may grip the rope with a better holding effect, as will be understood on reference to Fig. 2.

In order to guide the two turns of rope properly onto and off the differential pulley, two openings $p$ are formed in the lower part of the block, each opening of a flattened oval shape and with anti-friction rollers $b$ at the edges for the outer turn of rope to run against.

It will be understood that at any one moment in the operation of the pulley only those gripping-levers which are above the horizontal plane passing through the axis of the pulley are so acted upon by the strain on the turns of rope as to grip the outer turn of rope, and as the two ropes pass off the pulley the pressure on the inner arms of the gripping-levers is removed at that point, and the grip upon the outer rope is accordingly relieved. The long arms of the elbow-levers then drop back by gravity and leave the groove open, as shown at the lower part of Fig. 3, until the oncoming turn of rope at the other side of the wheel presses against the short arms of the elbow-levers. As the turns of the rope travel together and the difference of speed between the two is in exact proportion to and, in fact, due to the difference of the radial distances of the center lines of the rope from the axis of the pulley, there is no rubbing friction between the two ropes.

Although I have shown the differential pulley as provided with eight pairs of gripping-levers, I do not wish to restrict myself at all in this respect, as their number may vary according to circumstances. For ordinary purposes six pairs of such levers will suffice.

The block of the pulley may be constructed in any suitable way. In the present instance I have shown it as made in two parts and held together by the pins $b'$ of the anti-friction rollers $b$ and by the center pin P, on or with which the differential wheel turns.

If it is desired to construct the block for very heavy work, there may be combined with the differential wheel in the block an additional loose wheel W, over which the endless rope would be carried, and in such case, of course, an additional wheel or sheave would be needed on the runner, as shown in Fig. 5.

I claim as my invention—

1. A differential pulley-block having a wheel with two turns of the rope passing over the wheel, one on top of the other, and gripping devices to grip the outer turn and lock the pulley under the weight of the load, all substantially as described.

2. A differential pulley-block having a wheel with two turns of the rope passing over the wheel, one on top of the other, and gripping-levers carried by the wheel, to be acted on by the inner turn of rope to grip the outer turn, all substantially as described.

3. A differential pulley-block having a wheel with a single deep groove, two turns of rope passing over the wheel, one on top of the other in this groove, and gripping-levers pivoted in notches in the flanges of the grooved wheel, to be acted on by the inner turn of the rope to grip the outer turn, all substantially as described.

4. A differential pulley-block having a wheel, two turns of rope passing over the wheel, one on top of the other, and gripping-levers on opposite sides of the rope, to be acted on by the inner turn to grip the outer turn, all substantially as described.

5. A differential pulley-block having a wheel, two turns of rope passing over the wheel, one on top of the other, and pairs of gripping-levers to be acted on by the inner turn to grip the outer turn, the two levers of each pair being on opposite sides of the rope and out of line with each other, all substantially as described.

In testimony whereof I have signed my name to this specification in the presence of two subscribing witnesses.

CHARLES F. BATT.

Witnesses:
JOHN REVELL,
HUBERT HOWSON.